United States Patent [19]
Asawa et al.

[11] Patent Number: 5,712,937
[45] Date of Patent: Jan. 27, 1998

[54] OPTICAL WAVEGUIDE INCLUDING SINGLEMODE WAVEGUIDE CHANNELS COUPLED TO A MULTIMODE FIBER

[76] Inventors: Charles K. Asawa; Mike H. Asawa; Jane K. Asawa; Michi Asawa, all of 16766 Bollinger Dr., Pacific Palisades, Calif. 90272

[21] Appl. No.: 347,947

[22] Filed: Dec. 1, 1994

[51] Int. Cl.$^6$ .................... G02B 6/30; G02B 6/28
[52] U.S. Cl. ............ 385/49; 385/50; 385/46; 385/28; 385/31; 385/132; 385/12; 359/110
[58] Field of Search ................. 359/112, 116, 359/110, 111; 385/12, 44, 13, 45, 46, 50, 129, 51, 52, 49, 48, 39, 42, 28, 29, 31, 124, 132; 340/541

[56] References Cited

U.S. PATENT DOCUMENTS

| | | | |
|---|---|---|---|
| 4,174,149 | 11/1979 | Rupp | 359/112 |
| 4,211,468 | 7/1980 | Steensma | 359/112 |
| 4,217,488 | 8/1980 | Hubbard | 359/112 |
| 4,463,254 | 7/1984 | Asawa et al. | 250/227.16 |
| 4,639,074 | 1/1987 | Murphy | 385/52 |
| 4,903,339 | 2/1990 | Solomon | 359/112 |
| 4,930,854 | 6/1990 | Albares et al. | 385/49 |
| 4,940,306 | 7/1990 | Kitayama et al. | 385/46 |
| 4,942,623 | 7/1990 | Asawa et al. | 359/116 X |
| 4,953,935 | 9/1990 | Suchoski, Jr. et al. | 385/46 |
| 4,965,856 | 10/1990 | Swanic | 359/112 |
| 5,003,623 | 3/1991 | Asawa | 359/112 |
| 5,134,386 | 7/1992 | Swanic | 340/541 |
| 5,194,847 | 3/1993 | Taylor et al. | 340/541 |
| 5,231,683 | 7/1993 | Hockaday et al. | 385/49 |
| 5,343,545 | 8/1994 | Ota et al. | 385/46 |
| 5,473,721 | 12/1995 | Myers et al. | 385/129 |
| 5,481,633 | 1/1996 | Mayer | 385/45 |

OTHER PUBLICATIONS

N. Takato et al., "Silica–Based Single–Mode Waveguides on Silicon . . . ", J. Lightwave Technology, vol. 6, pp. 1003–1010, Jun. 1988.

*Primary Examiner*—Rodney B. Bovernick
*Assistant Examiner*—Hemang Sunghavi

[57] ABSTRACT

An intrusion-alarmed optical fiber communication system, where light from two or more sources are launched with a planar channel waveguide launcher into two or more modes of a multimode graded-index transmission fiber, is disclosed. Input fibers containing the source light waves and the output fibers are in direct contact with the waveguide channels. Waveguide channels redistribute the light from input channels to output channels by rerouting, crossing, merging, or splitting channels. Waveguide launcher precisely launches data light into the fundamental mode and intrusion monitor light into high order modes of a multimode graded-index fiber. Fiber intrusion attenuates light in high order modes, but much less of the data in the fundamental mode, thereby forming a basis for the intrusion-alarmed system. Waveguide launcher permits light from a plurality of sources to be launched selectively into several types of fibers: singlemode fibers, multimode fibers, multi-core fibers, multimode fibers having high refractive-index ring profile within the fiber core boundary. Waveguide channel configuration permit other versatile functions to be performed; these include optical time domain reflectometry, channel feedback stabilization of the diodes, launching light from more than one light source into the fundamental mode of a multimode graded-index fiber, and other functions. Means for launching and propagating the fundamental mode in multimode graded-index fiber in order to increase bandwidth capacity of said fiber are disclosed. Optical-electronic intrusion-alarmed systems with synchronous phase sensitive detection of intrusion are described, including reference recovery means. In order to decrease false alarm rates, information on transmitter light source variations are transmitted to the receiver via digital bit stream. A precise fiber optic sensor system based on the waveguide launcher is disclosed.

13 Claims, 8 Drawing Sheets

FIG. 3A REFRACTIVE INDEX

OPTICAL WAVEGUIDE INCLUDING SINGLEMODE WAVEGUIDE CHANNELS COUPLED TO A MULTIMODE FIBER

BACKGROUND OF THE INVENTION

1. Background-Field of Invention

This invention relates generally to optical fiber systems where light is carried in two or more different sets of modes of a multimode fiber. More specifically, this invention relates to optical fiber intrusion-alarmed communication system and to sensor systems.

2. Background-Purpose

Many of the developing fiber optic communication systems will be data highways for distributing non-critical information, requiring no security or minimal security.

But there will be an immense number of links transmitting highly proprietary commercial or industrial or secret information from point to point. Security will be required for distribution of proprietary financial data, marketing strategies, proposals, engineering processes, software and logic development, sensitive and secret material, etc. Security from intrusion will be required by customers for these critical networks.

Security is offered by high level encryption algorithms. But high level encryption algorithms limit bandwidths and bring with it the problem of key management, which can be cumbersome and offers intruders opportunities for breaching the links. Further, intrusion of an encrypted system may remain undetected, allowing continued loss of sensitive information.

Another technique for high security is our intrusion-alarmed fiber optic system, where measured evidence of intrusion results in termination of data transmission. In one configuration the data light waves are transmitted in the low order modes of the fiber, and the monitor light waves for guarding the data are transmitted in the high order modes of a multimode graded-index fiber. Perturbation of the fiber by an intruder seeking to tap the data results in greater reduction in the monitor signal strength relative to the reduction of data signal, leading to action to terminate the data transmission and, then, to pinpoint the location of the breach.

BACKGROUND-BASIC

Several hundred to several thousand modes may propagate in multimode fibers manufactured today. A multimode fiber with a core having a parabolic refractive-index profile, commonly called "graded-index" fiber, is manufactured for communication applications and usually have fiber core diameters of 50.0 or 62.5 micrometers. Several hundred modes of propagation are possible in such a fiber.

Modes are characteristic light wave patterns of the light wave transmitted down the fiber. These modes are also described as solutions of Maxwell's equation for electromagnetic waves propagating in the bound core medium of the fiber.

Although we describe the invention in this section largely in terms of graded-index fiber and two sets of modes for specific illustrations, our invention is not limited to these parameters.

In a multiple mode application, one set of low order modes, which may be the lowest order mode, or fundamental mode, travels near the center of the fiber, with its mode diameter limited to a small fraction of the fiber core diameter and volume. Another set of modes is a set of high order modes with a mode diameter and volume filling most of the fiber core. A third set of modes launched into other modes can be used to perform diagnostics of the fiber, to pinpoint location of intrusion, determine breaks and transmission quality of the fiber, etc.

The first two sets of modes, described above, in multimode graded index fiber have different transmission attenuation characteristic when the fiber is disturbed, or perturbed, such as bending, along its length. Light waves traveling in the lowest, or fundamental, mode in multimode graded-index fiber suffers only minimal transmission attenuation, even with very severe perturbations of the fiber. On the other hand, light waves in high order modes experience measurable transmission losses for small perturbation of the fiber.

The differing attenuation characteristics are used in our invention for (1) a secure intrusion-alarmed fiber optic communication systems and (2) a high sensitivity fiber optic sensor system, but the invention is not limited to these applications.

In our multimodal intrusion-alarmed communication system, the digital data is carried in the fundamental mode, or lowest order mode, of the multimode graded-index fiber. Light transmitted in the high order modes is called the monitor, since attenuation of the monitor light is used to indicate that an intrusion of the fiber is occurring. Intrusion of the fiber by an intruder, such as by bending of the fiber to extract and detect some of the light travelling in the fiber, will cause a transmission loss of the high order monitor mode and a much less transmission loss of the fundamental mode carrying the data, when measured at the receiver. When a measured attenuation at the receiver is above a set alarm threshold, an alarm signal is sent from the receiver to the transmitter to stop sending data. Details on how to detect the intrusion are further described as part of our invention.

Launching, or injecting, light from two different sources into low order data modes and high order monitor modes of graded index fiber simultaneously is much more difficult than into step index core, or constant refractive index core, fiber, where angle of launch is the only parameter governing the modes launched. For graded index fiber both the radial position and angle of light launched into the multimode graded index fiber determine the mode launched into the fiber.

Low order modes are launched with light rays, or light waves, entering the core at small angles and small radii in multimode graded-index fiber. Low order modes are constrained to the center of the fiber core. High order modes can be launched either with light rays having large angles and a specific range of radii, or with large radii and a small specific range of angles. Requirements for selective modal launching are described in further detail below in the Description of the Preferred Embodiments section.

Improved and versatile means for selectively launching multiple sets of modes with planar waveguide launchers and new optical fiber perturbation detection methods are described as part of our invention.

BACKGROUND-DESCRIPTION OF PRIOR ART

Launching low and high order modes simultaneously into multimode graded-index fiber is described in our (Charles K. Asawa) U.S. Pat. No. 5,003,623, entitled "Bimodal Intrusion Detection in an Optical Fiber Communication System Using Graded Index Fiber", Mar. 26, 1991. However, the patent covers exclusively a bimodal launcher which uses discrete lenses to launch high and low order mode simultaneously into multimode graded index fiber. Further, no intrusion detection system configuration is covered.

Said lensed bimodal launcher is a mechanical structure having two discrete lenses, a unit called a spatial modal filter to limit angles of launch, a reflector, fiber holders, and mechanical means for aligning the fibers to the lenses. The reflector and spatial modal filter are inserted between two quarter-pitch graded-index lenses, available commercially as "SELFOC" lenses. A single mode fiber containing the data and a multimode graded-index transmission fiber are aligned on one end of the lens pair so that the single mode fiber is imaged at the core center of the transmission fiber. A multimode fiber containing the monitor light is aligned at the other end of the lens pair so that its core is imaged on the core of the transmission fiber. The annular spatial modal filter was used to limit the angles of the monitor light rays entering the transmission fiber.

Multiple fibers to a single fiber imaging via a discrete lens system uses a complex and precise, but bulky, alignment mechanism. Alignment of the image of the single mode fiber end with the lenses onto the core center of a graded index multimode transmission fiber is required to launch low order modes. A multimode fiber containing the monitor light is imaged onto the transmission fiber by aligning the input multimode monitor fiber through the lenses to the transmission fiber; the alignment permits launching of high order modes into the graded-index multimode transmission fiber.

Various disadvantages of a bimodal launchers using discrete lenses are cited below:

(a) We found the alignment process for the lensed launcher to be tedious and time consuming, and therefore costly. Variations in lens parameters from lens to lens required alignment of the fibers in three dimensions, with lateral alignment made to a tolerance of one micrometer. Lateral alignment controls the position of the image at the entrance face of the multimode transmission fiber.

(b) The units constructed were found to be susceptible to misalignment during severe temperature tests, due to the use of materials with dissimilar temperature expansion coefficients: glass lenses, metal lens holders, metal or plastic fiber holder, silica fiber, metal adjustment screws, and epoxy adhesives.

(c) The bulky launcher with metal alignment fixtures was unable to withstand repeated shocks of one meter drops onto a hard floor, which may be experienced during deployment.

(d) Optical attenuation of the monitor modes due to the annular spatial modal filter and due to the limited acceptance angles of the graded-index transmission fiber permitted only about 15% of the monitor light to enter said fiber.

(e) Possibility for expanding the use of said lensed launcher to perform other functions is limited by the lenses and the size of the fibers.

(f) The machining of precision components for holding the lenses, fibers, and adjusting mechanism, and the time-consuming alignment added significant cost to the lensed bimodal launcher.

The high cost of the lensed bimodal launcher, its alignment difficulty, its inability to withstand temperature changes and mechanical shock, its excessive optical loss and its limited versatility led to a search for a new type of multimodal launcher. Further, desire for protection of sensitive information during transmission led to a search for an effective intrusion-alarmed optical fiber communication system.

SUMMARY: OBJECTS AND ADVANTAGES OF OUR INVENTION

The planar waveguide multimodal launcher of this invention solves the problems of the lensed launcher, described above. Also, the waveguide launcher permits channel feedback stabilization of the optical sources and permits optical time domain reflectometry to be performed on the transmission fiber. In addition, expanded detection methods and communication systems are significant parts of this invention.

Accordingly, several objects and advantages of our invention are:

(a) to provide a planar waveguide channel launcher in direct contact with output multimode and singlemode transmission fibers and direct contact with input fibers, and which requires no lens imaging and has no movable parts;

(b) to provide a planar waveguide channel launcher whose geometry permits rerouting, crossing, merging, and splitting of channels, so that the input light waves from input fibers, in direct contact with the waveguide channels, are redistributed into waveguide channels at the exit end, where output fibers are directly in contact with the channels, and where the redistribution permit launching several specific modes into one or more multimode graded-index fiber simultaneously;

(c) to provide a planar waveguide channel launcher which launches the fundamental mode from one or more sources and high-order modes from one or more sources precisely into one, or more, multimode graded-index transmission fiber;

(d) to provide a planar waveguide channel launcher which has an input fiber for performing optical time domain reflectometry in a transmission fiber in addition to performing the functions described in (c);

(e) to provide a planar waveguide channel launcher which splits the light from a source by means of channel splitting, thereby offering a channel for feedback control of the light power in the channel;

(f) to provide a planar waveguide channel launcher with two or more channels merging into a single channel for merging light from two or more light sources for launching the combined light into selected modes of the multimode transmission fiber;

(g) to provide a planar waveguide channel launcher which launches a plurality of light waves into singlemode fibers, multimode fibers, multiple-core fibers, and multimode graded-index fibers having an additional high refractive-index ring profile within the fiber core boundary.

(h) to provide a planar waveguide channel launcher whose performance is resistant to wide temperature change and is resistant to severe mechanical shock;

(i) to provide a low-cost planar waveguide channel launcher which is precisely reproducible by means of photolithography at commercial optical waveguide foundries;

(j) to provide a precision planar waveguide channel launcher to which an array of input fibers in a precision fiber holder and an array of output fibers in a precision fiber holder in direct contact with the launcher are easily aligned and set;

(k) to provide a planar waveguide channel launcher which has a small excess loss of about one decibel;

(l) to provide a planar waveguide for launching optical light modulated with digital data at high bit rates into the fundamental mode of one or more multimode or multicore fibers, where transmission in the fundamental mode permits transmission at high data rates;

(m) to provide a connector means for launching high rate data into the fundamental mode of multimode fiber for transmission at high data rates in the said fiber, which may be already installed in the field;

(n) to provide an intrusion-alarmed fiber optic communication system with a planar waveguide channel launcher for launching the fundamental mode modulated with digital data and the high order monitor modes into one or more multimode or multicore fibers and detected with a power meter at the receiver, with a decrease in d.c. power level indicating intrusion perturbation of the fiber;

(o) to provide an intrusion-alarmed fiber optic communication system with a planar waveguide channel launcher for launching the fundamental mode modulated with digital data and the high order modes modulated with an analog sinusoidal monitor signal into one or more multimode or multicore fibers, with decrease in detected modulation amplitude of monitor signal at the receiver indicating intrusion perturbation of the fiber;

(p) to provide a system described in (o), where, in addition, synchronous phase sensitive detection of the monitor modulation amplitude is performed at the receiver, where the reference is transmitted to the receiver by means of digitally encoded bits in the data bit stream, and where the reference is recovered at the receiver for use in phase sensitive detection;

(q) to provide an intrusion-alarmed fiber optic communication system with a planar waveguide channel launcher launching the fundamental mode modulated with digital data and a sinusoidal signal, and a set of high order monitor modes, modulated with the same sinusoidal signal but in opposite phase, into one or more multimode or multicore fibers, where the two sinusoids cancel at the receiver, where direct detection of any sinusoid at the receiver indicates an intrusion perturbation of the transmission fiber;

(r) to provide a system described in (q), where, in addition, synchronous phase sensitive detection is used at the receiver, and where the reference signal is transported to the receiver via digitally encoded bit frames of the bit stream, which is then decoded to recover the reference for use in phase sensitive detection of intrusion at the receiver;

(s) to provide the system described in (q), or to provide the system described in (q), where, in addition, phase sensitive detection is used instead of direct detection, where the reference is modulated by the same sinusoidal source but is transmitted over the transmission fiber via a different wavelength and where the reference is optically filtered and detected at the receiver for use as the reference for phase sensitive detection of intrusion;

(t) to provide any one of the systems described in (o), (p), (q), (r), or (s) where, in addition, information at the transmitter on the sinusoidally modulated power in the data channel, where applicable, and in the monitor channel, or any other transmitter information, are digitally encoded and transmitted in the data bit stream to the receiver, where the power level information is decoded and used for comparing transmitted power levels and received power levels; the purpose is to prevent false intrusion alarm indication due to change of received levels, where the modulation levels of the monitor or data are inadvertently decreased or increased at the transmitter;

(u) to provide a fiber optic sensor system with a planar waveguide channel launcher for precisely launching high order modes modulated with a sinusoidal sensor signal into a multimode graded-index transmission fiber, where decrease in detected modulation amplitude of sensor signal at the receiver gives a measure of the amplitude of the phenomenon causing the decrease of the high order mode signal, and where the transmitter and receiver are collocated;

(v) to provide the system described in (u), where, in addition, phase sensitive detection is used to detect the modulation amplitude of the high order mode signal.

Further objects and advantages of our invention will become apparent from a consideration of the drawings and ensuing description.

BRIEF DESCRIPTION OF THE DRAWINGS

FIG. 1A shows an enlarged fragmented cross-sectional details at the interface of the multimode graded-index transmission fiber and the waveguide channels;

FIGS. 3 and 3A is a schematic description of the refractive index of the multimode graded index transmission fiber and mode launching conditions in said fiber;

DESCRIPTION OF THE PREFERRED EMBODIMENTS

PLANAR WAVEGUIDE MULTIMODAL LAUNCHER

Figure 1:
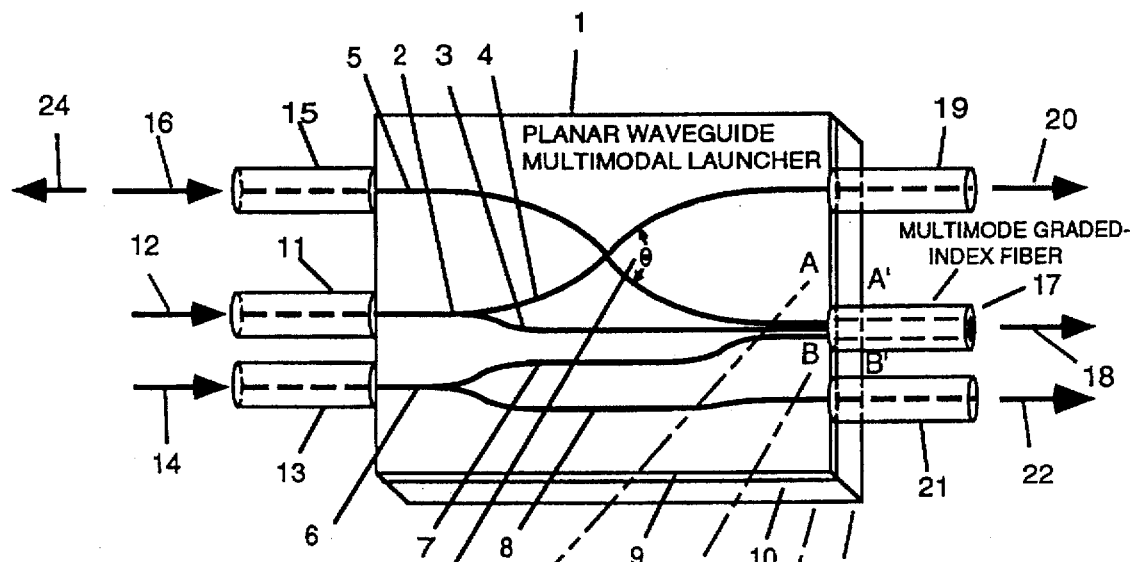
FIGS. 1 and 1A is a schematic view of a planar waveguide multimodal launcher and a plurality of fibers attached to the waveguide.

An embodiment of the waveguide multimodal launcher is illustrated in FIG. 1. Four launchers were fabricated to this design and tested. All launchers were able to launch high order modes and the fundamental mode simultaneously into multimode graded index fiber with great precision and minimal losses. Severe temperature and mechanical shocks tests resulted in no performance degradation. OTDR of the said fiber and channel feedback stabilization of the sources were performed.

The planar waveguide multimodal launcher of FIG. 1, indicated by reference numeral 1, has several singlemode waveguide channels fabricated on it. Six fibers are aligned and attached to the planar waveguide, three singlemode fibers at the input light source side on the left and two singlemode fibers and one multimode fiber on the right. Multimode graded-index fiber 17 is the transmission fiber and the modes propagating down the fiber to the receiver are indicated by the output 18.

A singlemode fiber 11 transfers light 12 from a data laser diode or light emitting diode (LED) source to waveguide channel 2; a singlemode fiber 13 transfers the light 14 from a monitor laser diode or LED source to waveguide channel 6; a singlemode fiber 15 transfers light 16 from an optical time domain reflectometer (OTDR) unit, described below, to waveguide channel 5.

The data source light 12 in waveguide channel 2 is split into two channels 3 and 4. The monitor source light 14 in waveguide channel 6 is split into two channels 7 and 8. The channels of the waveguide launcher 1 are rerouted, as indicated, in order to launch the data light 12 and monitor light 14 via channels 3 and 7, respectively, into the multimode graded index transmission fiber 17 in a specific way, to be described below in further detail. The light 16 from the OTDR unit in channel 5 is also launched into multimode fiber 17. Light from three different sources are launched into three different sets of modes of transmission fiber 17.

Part of the data light 12 splitting into channel 4 is launched into singlemode fiber 19 and that light 20 is detected and used to stabilize the light emission of the data source. The data source is stabilized with respect to the light power in the data waveguide channels and not with respect to diode back facet emission as normally done, where a detector can detect extraneous off-axis emission. Back facet emission detection would not stabilize the diode output with respect to the light in the channels and would result in extraneous noise in the data channels. Similarly, part of the monitor light 14 in waveguide channel 8 is launched into singlemode fiber 21, and that light 22 is detected and used to stabilize the monitor source with respect to light in the monitor waveguide channels.

The planar angle θ 23 between channel 5 and channel 4 at their intersection must be greater than 30 degrees in order to assure less than −30 decibels of light scattering into the crossing channel. That is, light propagating in channel 4 scatters less than 0.1% of its light into channel 5. Similarly, light propagating in channel 5 scatters less than 0.1% of its light into channel 4. This is important since, otherwise, appreciable data in channel 4 would be launched into high order modes via channel 5. The angle θ 23 is exaggerated in the drawing of FIG. 1 due to foreshortening of the waveguide length in the drawing for illustration purposes.

Figure 1A:
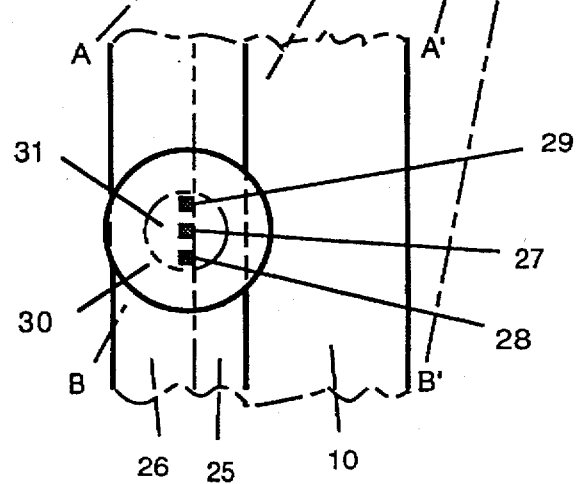

A cross-sectional schematic at the intersection of the waveguide output and the input of the multimode graded index transmission fiber 17 is illustrated in FIG. 1A. The core 31 and the cladding 30 of fiber 17 are indicated. The dimension of the core diameter, as illustrated, is 50 micrometers but its dimension is not restricted to that value. The dimensions of each of the cross-sections 27, 28, and 29 of the singlemode waveguide channels 3,7, and 5, respectively, as illustrated, are approximately 8 micrometers by 8 micrometers, but these dimensions are not restricted precisely to those values. The refractive index of waveguide channels 3, 7, and 5 is approximately 0.25% more than the nominal 1.46 value of the silica layers 25 and 26 surrounding the waveguide channels. These values are illustrative examples for singlemode channels for light at 1300 nanometer wavelength, but the values can be varied. Fiber 17 is aligned so that the axis of the waveguide channel 3 coincides with the axis of the fiber 17. Channel 3 with cross-section 27 launches the data light 12 into the fundamental mode of multimode graded-index transmission fiber 17, as will be shown below in FIG. 3.

The lateral axial separation of waveguide channels 3 and 7 at the interface is designed so that the cross-section 28 of monitor channel 7 is contained within core 31 boundary of fiber 17, with the corners of that cross-section nearly touching the core boundary. The monitor light 14 is therefore launched as one or more high order modes into fiber 17, as will be shown below in FIG. 3.

The splitting of light in one waveguide channel into two branching channels can be performed by channels forming a Y-junction, as indicated in FIG. 1 by channels 2, 3, and 4, or the splitting can be performed by a directional-coupler junction, for example, described in an article by N. Takato et al, pp. 1003–1010, J. of Lightwave Technology, vol. 6, no. 6, June 1988. With a precision directional coupler, any desired splitting ratios between the two branching channels can be attained.

An OTDR includes a high energy diode light source for launching a pulsed light signal into the fiber 17 via fiber 15 and channel 5 of waveguide 1, and a photodetector for detecting the intensity of light 24 backscattered or reflected back through fiber 17 as a function of time to provide an indication of backscattered light intensity for each point along the length of fiber 17. Any fiber perturbation leading to a change in the backscattered light can be sensed by the photodetector which indicates the location and magnitude of the perturbation. OTDR at the transmitter launcher terminal, or at the receiver, permits assessment of the health of the length of the multimode graded-index transmission fiber, such as breaks or severe bending of the fiber during installation, defective regions of the fiber, or possible time degradation of the fiber. With the use of a high dynamic range and high sensitivity OTDR unit, the point of intrusion may be detected, once an alarm is given.

The OTDR channel 5 with cross-section 29 may be located nearly symmetrically on the opposite side of channel 7 with respect to the channel 3 axis of cross-section 27, as indicated, or may be located at other positions within the core. The OTDR pulse will then launch high order modes into fiber 17. To increase the sensitivity of the OTDR, waveguide channel 5 and input fiber 15 can be made multimode by increasing the channel 5 widths and fiber 15 core diameter.

Planar waveguide launchers can be fabricated to launch light waves from a plurality of sources into singlemode fibers, multimode fibers, multicore fibers, and multimode graded-index fibers having an additional high refractive index ring profile within the fiber core boundary.

SECOND EMBODIMENT OF WAVEGUIDE LAUNCHER

Figure 2:
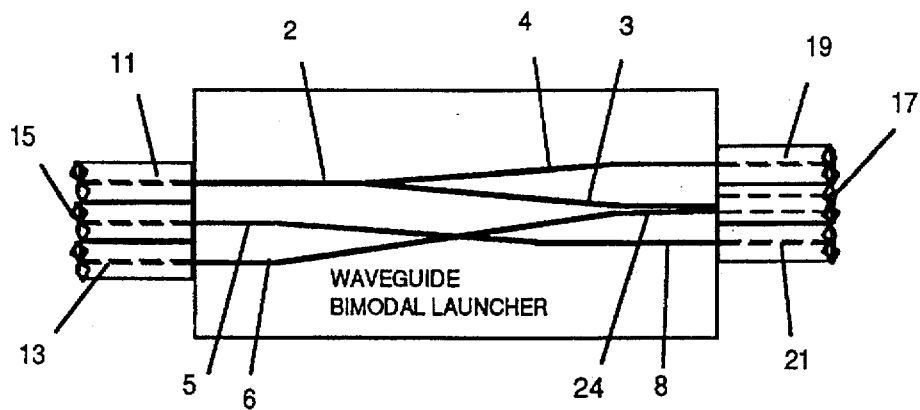
FIG. 2 is an alternative waveguide configuration for performing similar functions as the configuration of FIG. 1.

An alternative configuration for the waveguide multimodal launcher is illustrated in FIG. 2. The difference in channel configurations between the embodiments of FIG. 1 and FIG. 2 is that the OTDR channel and the monitor channel use the same channel 24 for launching light into fiber 17. Channel 24 may be angled at a degree or two with respect to the channel 3 near the fiber interface since most of the waveguide 3 cross-section lies within the fiber core; this angle variation also applies to channels 7 and 5 with respect to channel 3 of FIG. 1. The indicated abrupt changes in direction of the waveguide channels in the illustration of FIG. 2 are actually smooth curved transitions.

LAUNCHING MODES INTO MULTIMODE GRADED-INDEX FIBER

FIG. 3A illustrates the refractive index profile of the multimode graded-index transmission fiber 17. The optical refractive index 32 of the core varies with radius, with a maximum at the core axis of the fiber, decreasing with increasing radius, and is equal to the refractive index of the cladding 33 at the core-cladding boundary. The preferred graded-index profile is a parabolic refractive index profile for communication application since the widest bandwidth can be transmitted with that profile. The refractive index of the cladding 33 is about 1.46 and that at the maximum of the multimode core is about a percent larger.

Figure 3:
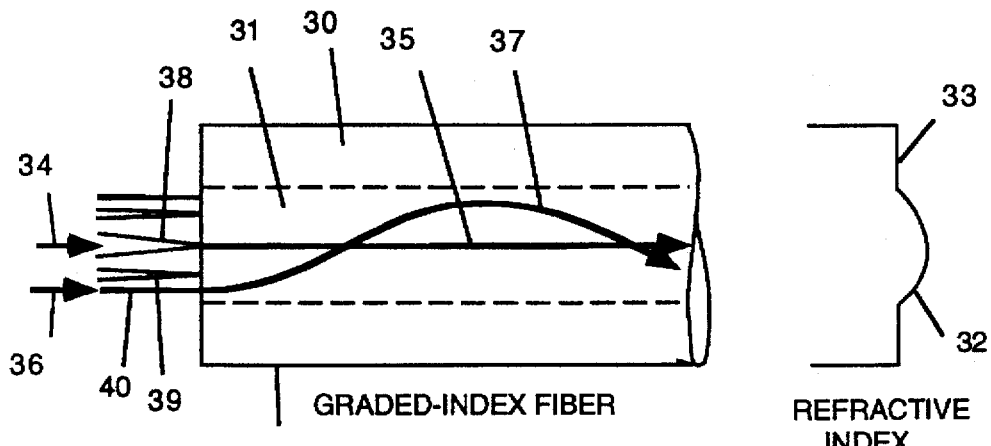

The mode launched into multimode graded index fiber depends upon the angular orientation of the light wave, or rays, and its radial position. The left side of FIG. 3 illustrates this dependency. The angles 38, 39, and 40 represents the cone angles within which rays entering the graded-index fiber can propagate down the core of the fiber. The cone angles represent twice the localized numerical apertures of the graded index fiber where the numerical aperture is dependent upon the local refractive index and the cladding refractive index, as described, for example, in H. G. Unger, *Planar Optical Waveguides and Fibres.* p. 464, Oxford University Press, 1977. Rays entering the fiber outside the cone at a given radius will radiate out of the core or become leaky modes which eventually leave the core. It is noted that the largest cone angle is at the core axis, with cone angles decreasing with increasing radii. At the core axis, or zero radius, nearly all modes of the fiber can be launched. The fundamental mode can only be launched with rays at zero input angle at zero radius, as illustrated by ray 34. Ray 35 represents the fundamental mode transmitted down the fiber. The data waveguide channel 3 of FIG. 1 with its axis collinear with the axis of the multimode graded-index transmission fiber 17 satisfy the requirement for launching the fundamental mode.

A modification to the ray rule for radii of launch must be made for the fundamental mode, since the fundamental mode in the wave description has a cross-sectional diameter of about 8–10 micrometer in a multimode graded-index fiber, as determined from wave theory and experiments. Therefore, the channel waveguide with a cross-sectional area of 8×8 micrometers propagates a single mode wave that nearly matches the fundamental mode of the multimode graded-index fiber. When the axes of the channel waveguide and the multimode fiber are collinear, efficient launching of the channel single mode into the fundamental mode of the multimode graded-index fiber occurs.

High order modes can be launched into multimode graded index fiber with a light ray at zero radius and at non-zero angle within the cone shown in FIG. 3. Or, high order modes can be launched at large radii less than the core radius and with zero or small angles. Thus, high order modes, or ray 37, in the fiber can be launched by ray 36 which is within the small cone 40 at large radius. These requirements are satisfied by the orientation of the waveguide channel 7 and cross-section 28 with respect to the fiber 17 and its core 31, shown in FIG. 1A.

We note again that the ray description is not a precise physical representations of light propagating down the fiber, but the ray picture is a convenient method for describing ray propagation in many cases. The real descriptions are given by the electromagnetic wave solutions of Maxwell's equations in a bound fiber medium, and are described as modes.

TRANSMISSION LOSSES FOR FUNDAMENTAL MODE AND HIGH ORDER MODES DUE TO FIBER PERTURBATION

As stated previously, data light is sent in the fundamental mode and the monitor is sent in high order modes in multimode graded index fiber. The modes have different transmission attenuation characteristic when the fiber is disturbed, or perturbed, such as bending, at a point along its length. Light traveling in the lowest, or fundamental, mode in multimode graded-index fiber suffers only minimal transmission attenuation, even with very severe perturbations of the fiber. On the other hand, light in high order modes experience higher losses for smaller perturbation of the fiber. The differing attenuation characteristics are used in our invention for secure intrusion-alarmed fiber optic communication system, and the high loss of the high order mode is used in the fiber optic sensor system.

Figure 4A:
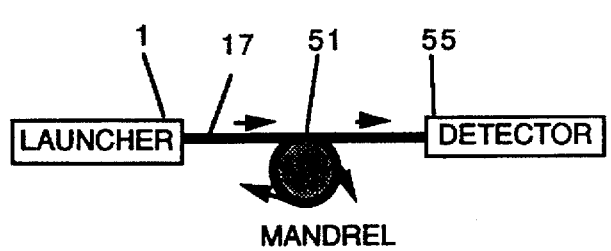
FIGS. 4 and 4A is a graph showing measured losses of light propagating in high order modes and in the fundamental mode due to bending perturbations of the fiber.
Figure 4:
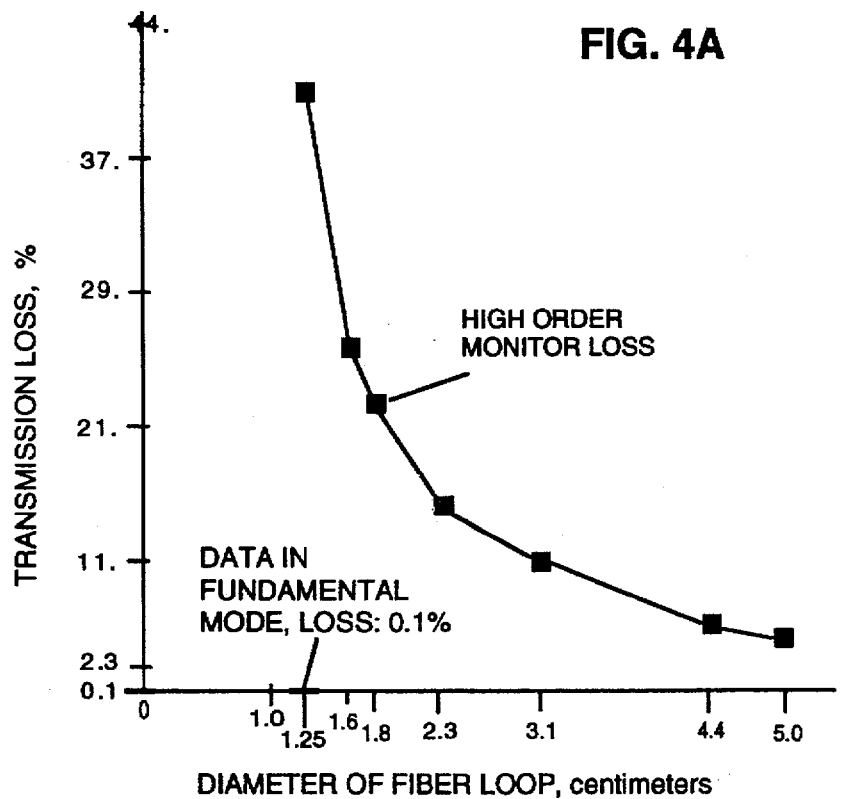

As shown in the graph of FIG. 4, when the data light is sent by launcher 1 in the fundamental mode of the multimode graded index fiber 17, the data light suffers only a minimal amount of loss due to a bending of the fiber, as measured by the light transmitted to detector 55 of FIG. 4A. The fiber bend perturbation 51 was a single loop of various diameters. In contrast, the transmission losses of the high order monitor modes were appreciable for these perturbations and easily detectable. For example, a perturbation of a single loop of 1.25 centimeter diameter results in a loss of only 0.1% of the light in the fundamental data mode, while the loss of light in the high order monitor mode is about 40.%. That is, the data light in the fundamental mode is very secure, but the monitor light in the high order mode loses appreciable power. If the bend perturbation is due to an intrusion attempt to extract light from the fiber, the decreased transmission of light in the high order mode is detected by detector 55 and is used to denote that an intrusion is taking place.

The differences of modal attenuation shown in FIG. 4 is the basis for the intrusion-alarmed multimode graded-index fiber communication system. For any intrusion perturbation of the fiber, the data is very secure, but the monitor attenuation is sufficiently sensitive to indicate that an intrusion is in progress.

MODULATION AND DIRECT DETECTION METHODS

Figure 5A:
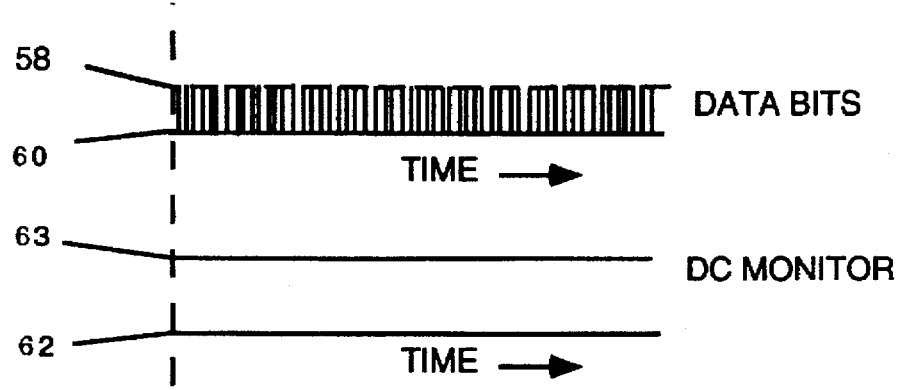
FIGS. 5A to 5C illustrates how the light in a data channel and a monitor channel may be modulated for a multimodal graded index fiber intrusion-alarmed communication system.

There are several methods for detecting intrusion. A general requirement is that the signal for intrusion exceeds the detection noise. Three different modulation-detection methods are illustrated in FIGS. 5A to 5C.

(a) A simple way is to detect changes in the direct current dc power level of the high-order mode monitor at the receiver. Monitor light in the high order mode is sent at a constant power level 63 and the digital data light is sent at a constant level 58, as illustrated in FIG. 5A. The zero output levels 62 and 60 for the monitor and data channels, respectively, are indicated.

The dc detection method suffers low frequency 1/f detector noise of the detector, low frequency optical source noise and propagation modal noise. This method is good if the received monitor power is sufficiently high to exceed the low frequency noise. The data bit stream is transmitted via the fundamental mode. The data bit stream and the dc monitor output can be detected at the receiver by a common detector or by separate detectors, as described below.

Figure 5B:
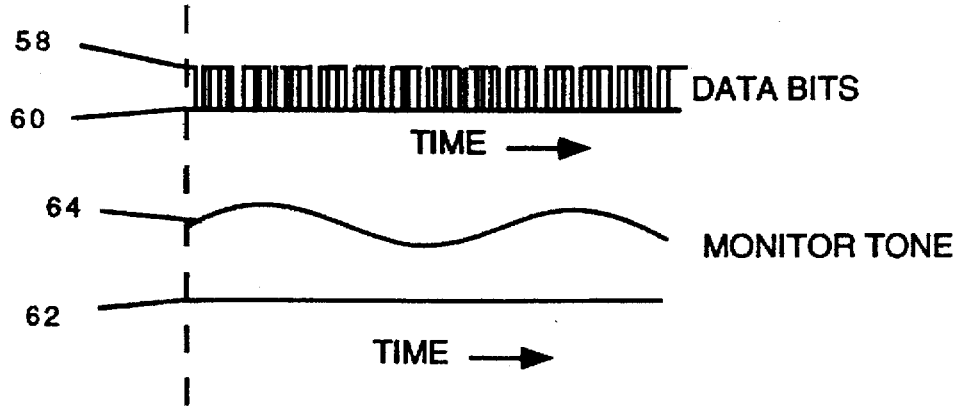
Figure 5C:
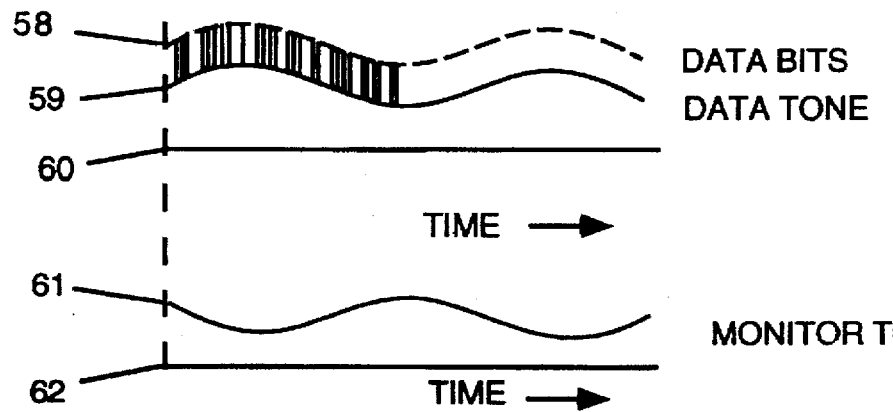

(b) Modulating the monitor optical source with a sinusoidal audio tone 64, as shown in FIG. 5B, and then detecting and evaluating a decrease in tone power at the receiver as evidence of intrusion is another method. The digital data bit stream 58 is sent in the fundamental mode.

Frequency of the tone may be in the audio range or higher. At the receiver after detection a narrow band pass filter centered at the tone frequency will eliminate the low frequency noise outside the filter bandwidth. This method is simple and effective.

The data light and the monitor light can be detected with a single detector or with two detectors. With a single detector the wavelengths of the two sources need to be sufficiently close to be detectable with high response. After detection the data is electronically routed to the data signal processor and the monitor to the alarm unit via a narrow band pass filter and rectification.

Figure 10:
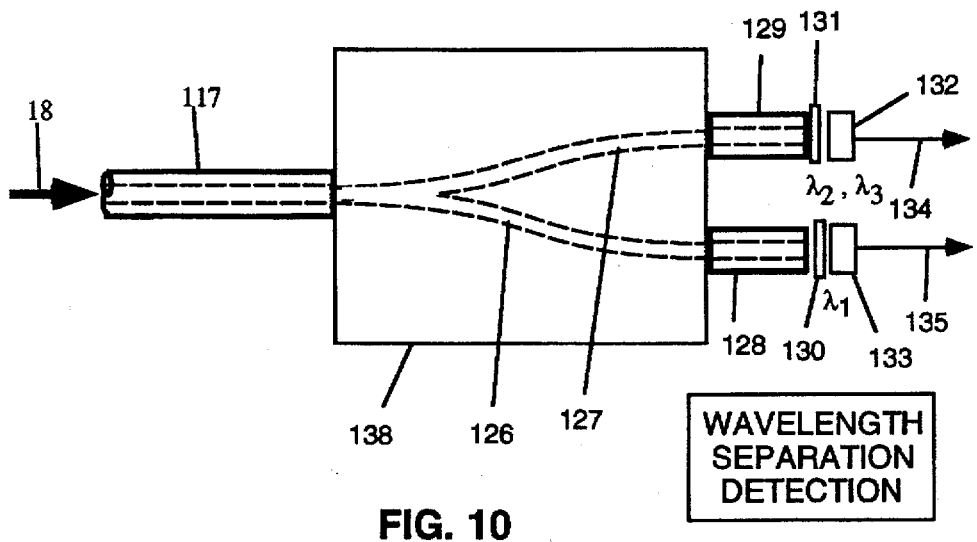
FIG. 10 is a schematic illustration for separating two or more wavelengths of light at the receiver.

If the wavelengths of the data light and the monitor light are sufficiently different, wavelength separation may be performed, as illustrated in FIG. 10, before detection by the two detectors. The output of one of the detectors is the digital data which is routed to the data signal processor. The output sinusoid of the other detector is passed through a narrow band pass filter centered at the tone frequency to eliminate low frequency noise. The output of the detector is rectified and then routed to the alarm unit.

(c) Modulation of both data channel and the monitor channel with a sinusoidal tone in opposite phase but equal amplitudes to null the modulation tone at a detector is another method, as illustrated in FIG. 5C. Then, the tone output at the receiver is zero until an intrusion occurs, which decreases the monitor amplitude, resulting in a non-zero tone in phase with the data tone.

The data diode source is modulated by an audio tone 59 and also by a high data rate bit stream 58. Zero levels are again denoted by levels 60 and 62. The monitor diode source is modulated by the same audio tone but at 180 degrees out of phase 61.

Both waveforms are launched into the multimode graded index fiber 17 of FIG. 1 via channels 3 and 7. At the receiver a single detector is used to detect the transmitted signals. At the receiver the high data bit stream 58 is routed to a receiver data signal processor. The low frequency tone, which is a sum of tone 59 and tone 61 are routed to an intrusion alarm processor via a tone frequency filter. The detected audio tone amplitude will be zero if the detected audio tone amplitudes of the data channel 59 and monitor channel 61 are equal at the receiver. Then, only the digital data bit stream 58 will be detected at the receiver. The modulation output of the monitor or data sources can be adjusted to null the audio tone during initialization of the intrusion alarm system.

When an intrusion attempt occurs with a perturbation of the multimode graded index transmission fiber, the amplitude of the high order mode monitor tone 61 received at the receiver will be attenuated more than that of the data tone 59 in the fundamental mode. A non-zero audio tone amplitude will signify that the fiber has been perturbed.

PHASE-SENSITIVE DETECTION AND REFERENCE RECOVERY

In order to extract the amplitude of sinusoidally modulated signals buried in noise with precision and stability, a synchronous phase-sensitive detection method can be used in conjunction with each of the tone modulation methods described above. For synchronous phase-sensitive detection a reference tone, exactly in phase and frequency with the originating audio tone that modulates the data and monitor diodes, must be available at the receiver phase-sensitive detector unit. That reference tone must be transmitted to the receiver.

The essential idea of phase sensitive detection is that the reference signal switches the noisy signal with alternate polarity at each half cycle of the reference frequency The resultant voltage or phase signal can be integrated by a low pass filter with time constants up to many minutes, if necessary. If there is no signal, the noise will integrate to zero. If there is a small signal buried in noise, the noise will integrate to zero, leaving a rectified dc value for the signal, which is dependent upon the phase between the signal and reference.

The integrating time constant corresponds reciprocally to very narrow band filtering of the signal tone but without its attendant instabilities. Since phase sensitive detection can detect very small changes in sinusoidally modulated signal buried in noise, the method can reduce apparent intrusion false alarms triggered by noise. Frequent false alarms will reduce data transmission volume and can seriously affect confidence in the intrusion-alarmed system.

The required reference tone can be sent to the receiver in at least two ways: (a) by digitally encoding bit reference information into multiplexed frames of the data bit stream, sending it via the fundamental mode to the receiver, and then recovering of the reference at the receiver, or (b) by transmitting the reference in the fundamental mode to the receiver at a different wavelength, for recovery of the reference at the receiver. Means of digital coding of the bit stream will be discussed below with respect to the transmitter and receiver of FIGS. 6 and 7.

OPTOELECTRONIC TRANSMITTER AND RECEIVER

Figure 6:
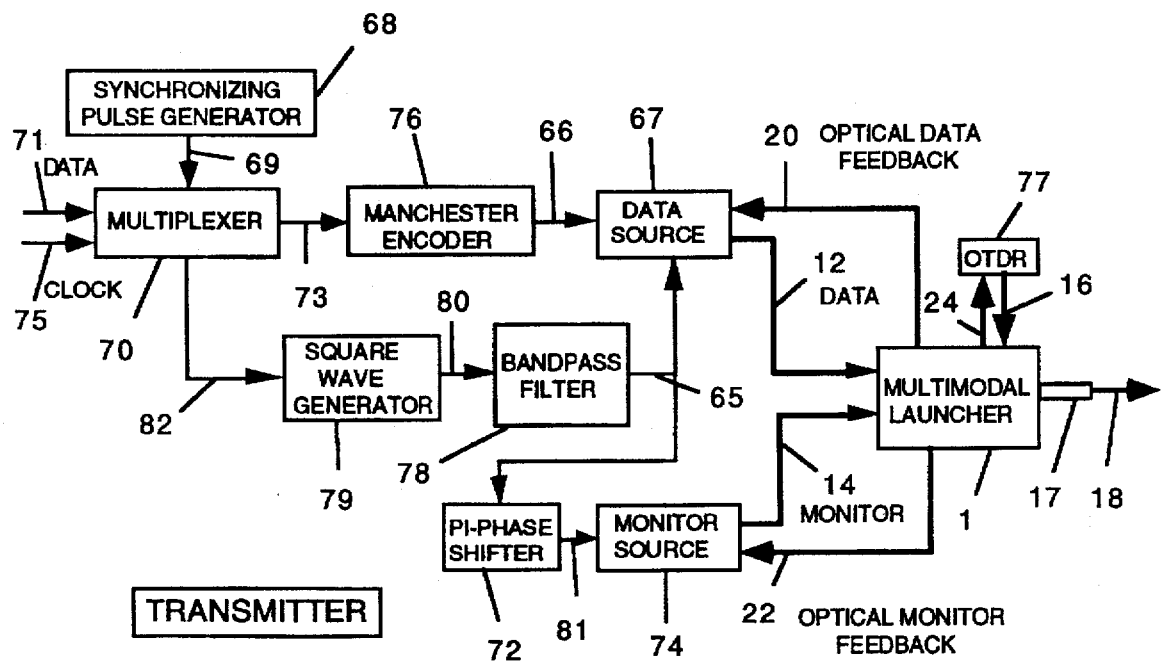
FIG. 6 is a schematic block diagram representation of a multimodal intrusional-armed transmitter using phase sensitive detection.
Figure 7:
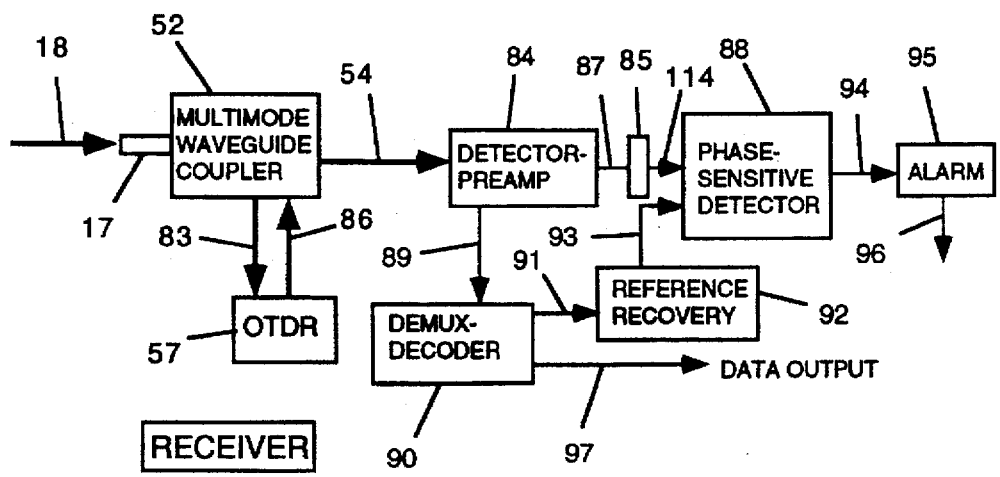
FIG. 7 is a schematic block diagram representation of a bimodal intrusion-alarmed receiver using phase sensitive detection.

The optical-electronic, or optoelectronic, transmitter and receiver for the multimodal graded index fiber intrusion alarmed communication system are illustrated in the schematics of FIGS. 6 and 7, respectively.

In FIGS. 6 and 7 the broader lines indicate the direction of the light. The lighter lines with indicate electronic flow directions. The fibers from the data source 67 and the monitor source 74 send their modulated light waves 12 and 14, respectively, to the launcher 1. The waveguide multimodal launcher 1 launches the data and monitor light waves into the fundamental mode and high order modes, respectively, of multimode graded index fiber 17, with the combined light waves 18 being transmitted to the receiver via fiber 17. The optical source 67 for the data and the optical source 74 for the monitor each consists of laser diode or LED, optical source driver network, channel feedback stabilization detector and circuitry, temperature stabilization unit, and a fiber optic Faraday optical isolator in the case a laser diode source is used. The isolator is desired since Fresnel reflected light from fiber silica-to-air interfaces, such as at connectors, result in severe spontaneous relative intensity noise (RIN) of a laser diode.

The data and the monitor light waves are launched into the fundamental mode and higher order modes of multimode graded-index fiber 17, respectively, as shown in FIGS. 1A and 3. The channel feedback data signal 20 and channel feedback monitor signal 22 from the launcher 1 to the data source 67 and to the monitor source 74, respectively, are used to stabilize the sources with respect to the optical powers in the respective channels by controlling the source currents.

Means for synchronous phase-sensitive detection of the signal arising from intrusion of the fiber are incorporated in the transmitter and receiver diagrams illustrated in FIGS. 6 and 7. Synchronous phase-sensitive detection was discussed above. If the intrusion signal is sufficiently high relative to the noise, direct detection would suffice and phase sensitive detection may not be needed, thereby simplifying the circuitry. However, phase sensitive detection is expected to reduce false alarm rate due to its detection principle, described above, and the long time constant signal averaging available.

For synchronous phase sensitive detection the second or third audio tone modulation methods, described above in FIGS. 5B and 5C, respectively, for direct detection may also be used for phase sensitive detection. The FIG. 5C modulation method is illustrated here, but the phase sensitive detection method is not limited to that modulation method.

The audio tone for modulating the data and monitor sources is obtained as follows: The digital data 71 and clock 75 are inputs to the multiplexer 70. Synchronizing pulse generator 68, provide framing bits 69 which are added at the beginning or end of each frame of data bits so that the receiver can identify the frame. The framing bits used for frame identification must be distinguishable from any possible data pattern. The framing bits are available at the transmitter and are also transmitted to the receiver.

At the transmitter framing bits are used to generate the standard audio tone which modulate both the data diode and the monitor diode. The output 82 of the multiplexer 70 are a sequence of framing bits which are fed to a square wave generator 79, or one shot monostable vibrator, to become a square wave 80 having the same frequency as the framing bit frequency. A narrow band pass filter 78 filters out the harmonics of the square wave frequency and passes the fundamental tone 65 for modulating the data source 67. The monitor source 74 is modulated with the same tone after a 180 degree phase shift of the tone by the piphase shifter 72, as previously shown by modulation envelopes 59 and 61 of FIG. 5C. If the frequency of the framing bits is too high, a divider network can be used to lower the frequency at both the transmitter and the receiver.

The output 73 of the multiplexer 70 is a sequence of data bit. Manchester encoding is performed on the non-return-to-zero, or NRZ, data bit stream with encoder 76, whose output 66 is used to modulate the data diode output 12. The bit stream 66 and the analog tone 65 additively modulate data source 67.

The OTDR unit 77 sends a pulse of light 16 from a laser diode located in the OTDR unit through the waveguide channel and launches the light into fiber 17. The backscattered light 24 is detected by a detector located in the OTDR unit.

At the receiver of FIG. 7 any detected audio tone amplitude is an indication of intrusion. For synchronous phase sensitive detection a reference tone exactly in frequency and in fixed phase with the tone modulating the monitor at the transmitter must be available at the receiver. The reference tone is recovered from the framing bits transmitted to the receiver. In FIG. 7 the data and monitor waves 18 in fiber 17 enter the multimode waveguide coupler 52 which splits the light into two paths. One path 54 is to the detector-preamplifier 84 and the other path is to the OTDR, to be described in FIG. 8. The output 87 of the detector-preamplifier 84 is passed through a filter-amplifier 85 centered at the tone frequency and its output 114 is the intrusion tone to be detected by the phase sensitive detector 88.

Output 89 of the detector-preamplifier 84 containing the digital bit stream is sent to the demultiplexer-decoder unit 90 whose output is the data output 97 and the framing bits 91. The reference recovery unit 92 consists of an amplifier, square wave generator, and bandpass filter tuned to the tone frequency. The recovered reference 93 is sent to the phase sensitive detector, whose dc intrusion output signal 94 is sent to alarm module 95, which then sends indication of alarm 96 to the link control unit.

OTDR AT THE RECEIVER TERMINAL

OTDR at the transmitter launcher terminal, or at the receiver, permits assessment of the health of the multimode transmission fiber along its length, such as breaks or severe bending of the fiber during installation, defective regions of the fiber, time degradation of the fiber, and permits pinpointing the intrusion point along the fiber. An OTDR includes a high energy diode light source for launching a pulsed light signal into the fiber, and a photodetector and signal averaging circuitry for detecting the intensity of light backscattered or reflected back through fiber as a function of time to provide an indication of backscattered light intensity for each point along the length of fiber.

Figure 8:
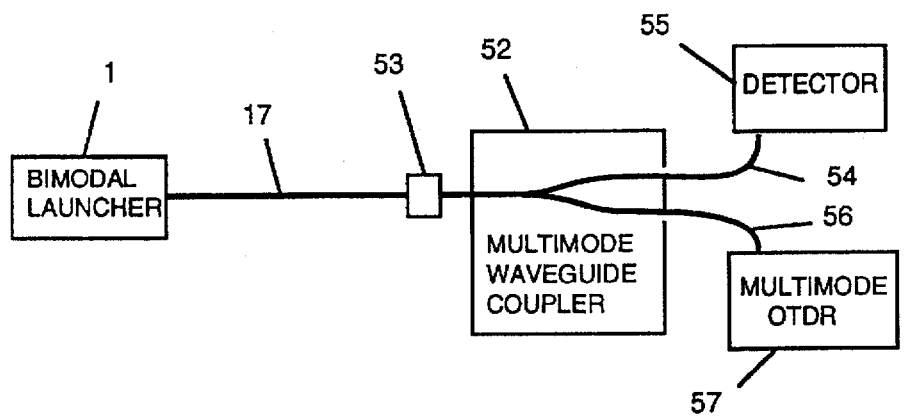
FIG. 8 is a schematic diagram illustrating the use of a multimode waveguide coupler for detecting the digital data as well performing optical time domain reflectometry (OTDR) simultaneously at the receiver.

FIG. 8 illustrates how a multimode waveguide 1×2 coupler 52 at the receiver terminal permits access of a multimode OTDR 57 to multimode graded-index transmission fiber 17 without waveguide mismatch of singlemode to multimode fibers. Higher energy pulses can be propagated down multimode fiber 17 with a multimode fiber OTDR, permitting higher sensitivity detection of defects or perturbations along the fiber. The OTDR light in fiber 56 consists of the light 86 from the pulsed laser diode of the OTDR unit and the back-scattered light 83, indicated in FIG. 7. Any multimode fiber perturbation leading to a change in the backscattered light can be sensed by the photodetector which indicates the location and magnitude of the perturbation. With the use of a high energy laser diode, a high dynamic range and high sensitivity multimode fiber OTDR unit, the point of intrusion may be detected, once an alarm is given. To denote any changes, the OTDR backscatter traces can be compared with any reference traces taken earlier. Fiber 54 connected to the other branch of coupler 52 transfers the digital data and data tone and monitor tone to detector 55.

TRANSMITTER OUTPUT POWER STATUS

Reduction of received monitor modulation power at the receiver at the tone frequency would indicate that an intrusion of the fiber had taken place. However, it is necessary to know whether the intrusion indication at the receiver is due to an inadvertent reduction of the monitor modulation power at the transmitter. Without this knowledge a false alarm may be sounded. This knowledge can be determined at the receiver by the following means:

The value of the transmitter monitor modulation power level, measured by the channel feedback detector, can be digitized and multiplexed into the data bit stream and transmitted via the fundamental mode to the receiver. At the receiver the modulation power level value bits are demultiplexed and decoded and the transmitter monitor power level determined at the receiver. The monitor modulation power at the transmitter is then available for comparison to the actual detected monitor at the receiver. An automatic adjustment will be made at the receiver for any increased or decreased transmitter power levels.

An automatic adjustment can be applied when the data channel is also modulated with the sine wave, as previously described, where the monitor tone and data channel tone cancel for no intrusion. The data channel feedback power level information will also be transmitted digitally to the receiver and decoded for use for automatically setting the threshold.

This digital bit stream method for transmitting information of the modulated tone power level at the transmitter can also be applied to a singlemode optical fiber communication system for detecting intrusion. Also, any other information regarding the transmitter can also be encoded and multiplexed into the digital bit stream and transmitted via the fundamental mode to the receiver for decoding and use by the receiver.

THIRD EMBODIMENT OF MULTIMODAL WAVEGUIDE LAUNCHER

By adding another diode source emitting at a different wavelength from that of the data and monitor diodes, the reference for synchronous detection can be recovered at the receiver without encoding the bit stream and without requiring a digital bit reference recovery circuitry at the receiver. The method described here can be used in a multimodal intrusion alarm communication system or in any other system requiring a reference signal at the receiver. The method can be used to transmit data or reference at a plurality of wavelengths in the fundamental mode or in higher order modes of the multimode graded-index fiber.

Figure 9:
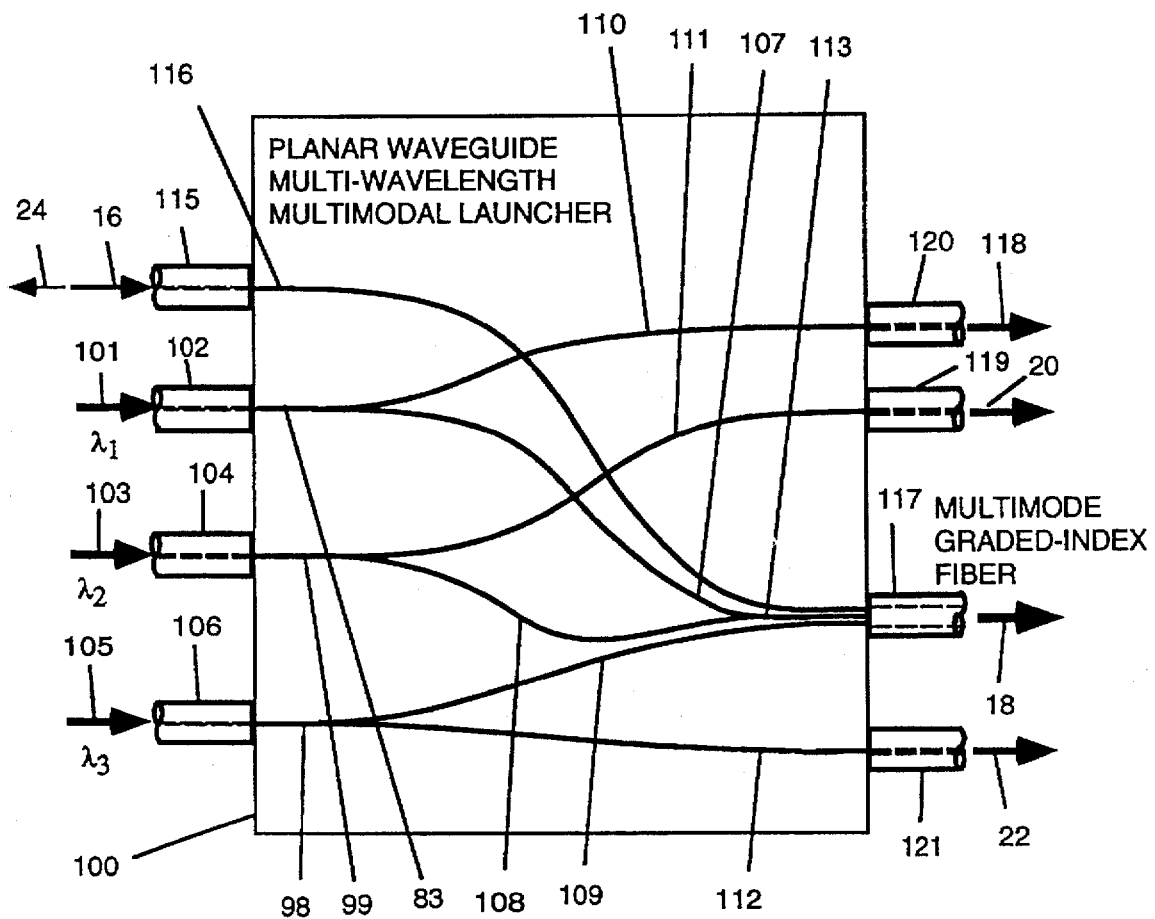
FIG. 9 is a schematic view of a planar waveguide launcher illustrating how light from many sources having different wavelengths may be launched simultaneously into many sets of modes of one or more multimode graded-index fibers.

In FIG. 9 the planar waveguide multimodal launcher 100 has four input single mode fibers on the left in contact with four waveguide channels. Input fiber 104 contains the data light 103 at wavelength $\lambda_2$; input fiber 106 contains the monitor light 105 at wavelength $\lambda_3$; and input fiber 102 contains the reference 101 at wavelength $\lambda_1$; and OTDR input fiber 115 contains the OTDR optical pulse 16 and backscattered light 24. Light from these sources are directed into waveguide channels 99, 98, 83, and 116, respectively, of the planar waveguide launcher 100.

Light at wavelength $\lambda_2$ in channel 99 is split into two channels 111 and 108. Light at wavelength $\lambda_2$ in channel 108 is merged into channel 113 whose symmetry axis is collinear with the axis of multimode graded index fiber 117. Light at data wavelength $\lambda_2$ is therefore launched as a fundamental mode of fiber 117.

The reference light at wavelength $\lambda_1$ in waveguide channel 83 is split into channels 107 and 110. Channel 107 is merged into channel 113. Reference light in channel 107, and therefore channel 113, is launched into multimode fiber 117 as a fundamental mode at wavelength $\lambda_1$. Therefore, data at wavelength $\lambda_2$ and reference at wavelength $\lambda_1$ are launched independently as fundamental modes in multimode fiber 117. All fiber to the right in FIG. 9 are in contact with the waveguide channels, as indicated.

Monitor light 105 at wavelength $\lambda_3$ in channel 98 is split into two channels 112 and 109. Channel 109 straightens out as it approaches the end of the waveguide. Channel 109 is directed into multimode fiber 117 near the boundary of the fiber core, so that monitor light at wavelength $\lambda_3$ is launched into high order modes.

OTDR light in channel 116 is launched into fiber 117 as a high order mode. The alignment of the monitor channel 109 and the OTDR channel 116 with the multimode graded index fiber 117 is similar to that described in FIG. 1. Again, OTDR channel 116 can be made multimodal for greater OTDR sensitivity by expanding the width of its channel; fiber 115 can also be multimode.

Fibers 120, 119, and 121 carry the light waves 118, 20, and 22 at wavelengths $\lambda_1$, $\lambda_2$ and $\lambda_3$, respectively. Outputs 118, 20, and 22 are used to stabilize the reference diode output, the data diode output, and the monitor diode output, respectively, with respect to the light traversing the respective channels, as discussed previously in FIG. 1.

The axis of channel 113 is aligned collinearly with the axis of multimode graded index fiber 117. Channel 109 near its output end may be parallel to channel 113 or may converge at one or two degree angle with respect to channel 113, where the cross-section of the end of channel 109 lies within the core boundary of multimode fiber 117. All intersections of channels must again be greater than 30 degrees in order to have crosstalk less than 0.1%.

To summarize, planar waveguide 100 of FIG. 9 performs the following function: launching the data into the fundamental mode at wavelength $\lambda_2$, launching the monitor into high order modes at wavelength $\lambda_3$, launching the reference into the fundamental mode at wavelength $\lambda_1$, and launching the OTDR optical pulse into high order modes of multimode graded-index fiber 117. In addition, feedback paths for stabilizing the data, monitor, and reference diode outputs to the light in the respective channels are provided. It can be realized that a plurality of light sources can be launched into the fundamental mode by the waveguide means described above where waveguide channels are crossed and merged. It can also be realized that, by splitting channels, rerouting, and merging, light from a plurality of light sources can be launched into a plurality of multimode graded-index fibers, where several wavelengths of light are selectively launched into selective modes of the fibers.

WAVELENGTH SEPARATION AND DETECTION AT THE RECEIVER

The schematic of FIG. 10 illustrates how wavelengths $\lambda_1$ can be separated from $\lambda_2$ and its nearly equal wavelength $\lambda_3$ in multimode graded index fiber 117 fiber. Light 18 is directed into the multimode waveguide 1×2 coupler 44, which splits the light into channels 126 and 127. Multimode fibers 128 and 129 are connected to the waveguide channels 126 and 127, respectively, and each receive the incoming light at all three wavelengths. Optical bandpass filter 131 passes wavelengths $\lambda_2$ and $\lambda_3$ while rejecting wavelength $\lambda_1$. Detector 132 detects the signal, whose audio tone portion of output 134 is the intrusion detecting signal sent to the phase sensitive detector via a low pass filter. Digital data portion of output 134 is sent to the digital demultiplexer. Optical filter 130 passes the reference wavelength at $\lambda_1$ while rejecting wavelengths $\lambda_2$ and $\lambda_3$. The recovered reference signal 135 detected by detector 133 is sent to the phase-sensitive detector reference input.

SENSOR SYSTEM

A significant advantage of using a planar channel waveguide launcher is that the modes launched into the a multimode graded-index fiber are consistent and do not change with time since the relative position of the channel waveguide to the multimode fiber is not changed. Therefore, high order modes launched into the fiber by the waveguide launcher will be fixed, so that a given perturbation of the fiber will cause a fixed attenuation of the light launched into the fiber. A calibration of attenuation versus perturbation can be relied upon over time. For a sensor system requiring reliable measurement of phenomena, such a calibration is necessary.

Figure 11:
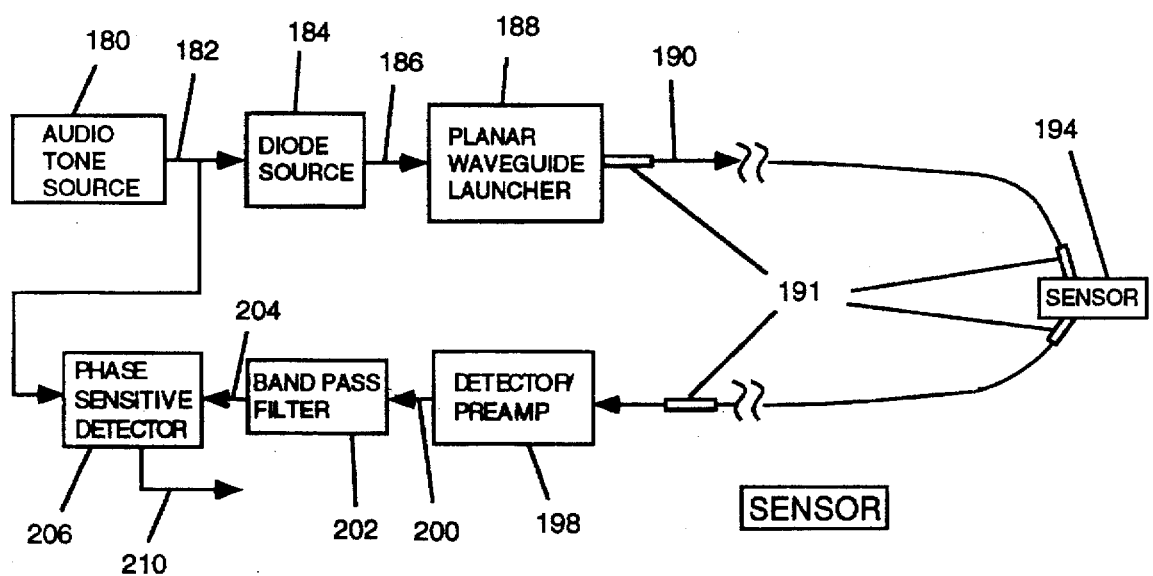
FIG. 11 is a schematic diagram illustrating the use of a bimodal launcher in a fiber optic sensing system.

The above discussions have been with respect to a bimodal intrusion alarmed system. In FIG. 11 a fiber optic sensor system is illustrated. The sinusoidal output 182 of audio tone source 180 modulates a diode source 184, whose optical light output 186 is the input to planar waveguide launcher 188. The audio tone 182 is also sent to the phase sensitive detector 206 as the reference for synchronous detection via copper wire.

Launcher 188 launches specific high order modes into fiber 191. The light 190 in fiber 191 is transmitted to fiber optic sensor 194, which passes the light to the detector/preamp 198. The high order modes are the sensor modes for detecting fiber bending or any other physical perturbation that interact with the higher order modes.

An increase or decrease of a physical phenomena interacting with fiber sensor 194 results in a change in attenuation of the high order mode light 190. The, transmitted light is detected by detector/preamp 198, whose electrical output 200 is sent to a band pass filter 202, whose output is the sensor signal 204. Signal 204 is sent to a phase sensitive detector 206. The output 210 of the phase-sensitive detector is a measure of the interaction intensity of the physical phenomenon with the high order modes of the optical fiber sensor 194. A calibration will give the magnitude of the physical phenomenon at the sensor.

WIDE BANDWIDTH OF DATA IN FUNDAMENTAL MODE

Group delay, or modal dispersion, is important in multimode fibers, since it is the primary parameter limiting bandwidth transmittable by multimode fiber. A short pulse of light, or a bit, launched into all modes of a multimode fiber spreads out in time as it traverses the fiber, so that a longer pulse is received at the receiver. This is due to a high order mode travelling down the fiber requires a longer time to get to a point in the fiber due to its longer path, than a low order mode with a straighter path, as depicted in FIG. 3. This is discussed in a number of texts, such as, "An Introduction to Fiber Optic Systems" by J. P. Powers, Aksen Associates, 1993.

Thus, two short pulses launched in quick succession may not be distinguishable at the receiver where two broadened pulses may mix as one long pulse. The pulse broadening is dependent upon fiber length as well as modal dispersion per length. The result is that a multimode fiber is bandwidth times distance product limited, which is dependent upon its refractive index profile. A multimode fiber with a parabolic graded-index refractive index with all modes uniformly filled has a bandwidth-distance product of approximately one gigabit-kilometers. For example, a one hundred megabit signal can be transmitted over ten kilometers, where adjacent bits can be distinguished at the receiver.

Single mode fibers are not limited by modal dispersion, but by other much smaller dispersions listed in the said book. Its bandwidth-distance product is a few orders greater than that of parabolic graded-index fiber with all modes filled.

Parabolic graded-index fiber with a bit stream launched into only the fundamental mode can be expected to have a bandwidth capability approaching that of the singlemode fiber. We have shown that it is difficult to convert the light in the fundamental mode in graded-index fiber into higher order modes, so the fundamental mode can be expected to not be converted into higher order modes in long lengths of graded-index fiber. Therefore, data launched into the fundamental mode by the multimodal launcher can be expected to have nearly the high bandwidth capability of singlemode fiber.

Many multimode graded-index fiber optic systems have been installed in the field during the past decade. These links have been used with T3 (45 megabit/sec.) or lower data rates. These systems can be updated to higher data rates with the bimodal launcher launching the data in the fundamental mode, as described above, or by a method described in FIG. 12.

Figure 12:
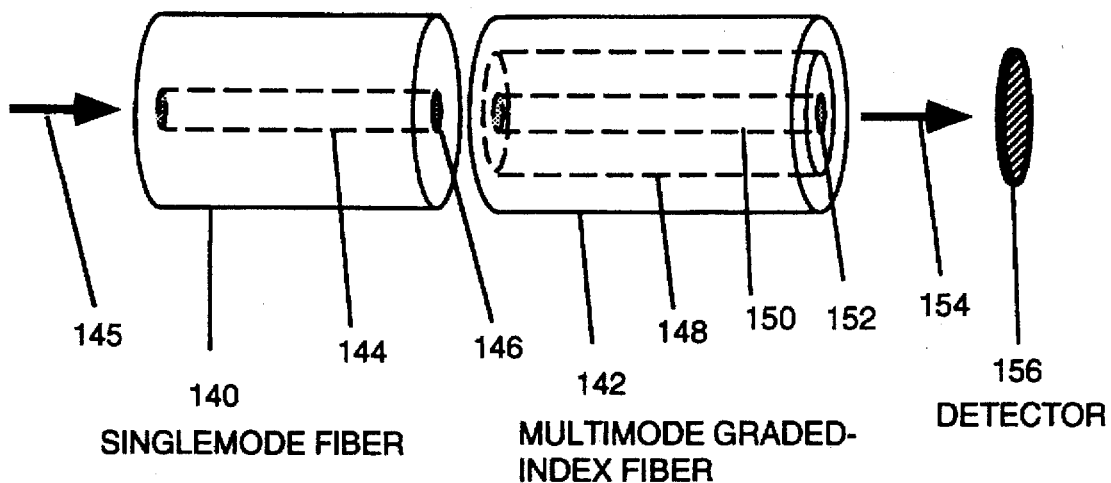
FIG. 12 is a schematic diagram illustrating how the fundamental mode of multimode graded index fiber can be launched by a singlemode fiber in contact with the multimode fiber.

In FIG. 12 an alternate method for launching the fundamental mode in multimode graded-index fiber is described. A singlemode fiber 140 containing optical data bit stream 145 from the transmitter, is launched into a multimode graded-index fiber 142. The fibers are axially aligned. Axial alignment is performed by a precise fiber optic connector, where singlemode fiber 140 and multimode graded-index fiber 142 are in mating ferrules of the connector. The single mode core 144 with its output cross-section 146 is aligned concentrically with the multimode core 148 so that the axis of core 144 is coincident with the axis of core 148. The light 145 is launched into the fundamental mode 150 of fiber 142. Light 154 from the output cross-section 152 of the fundamental mode is detected by detector 156. Fiber 142 may be multimode graded index fiber in existing or new systems.

NEAR FIELD METHOD FOR OBSERVING MODAL PATTERNS

Figure 13A:
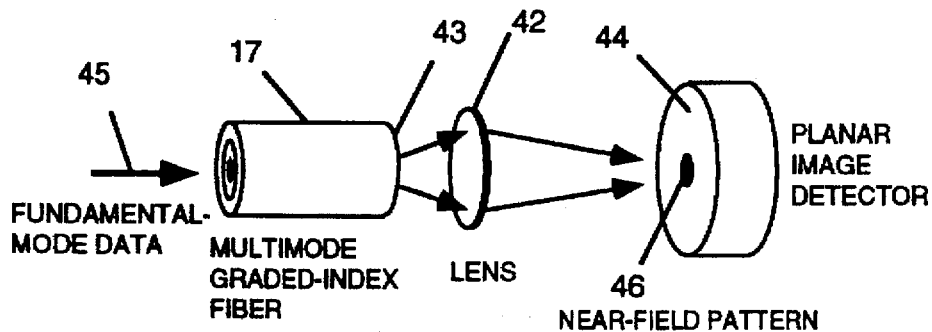
FIGS. 13A and 13B are schematic illustrations for near field observation of various modes propagating in multimode fiber.
Figure 13B:
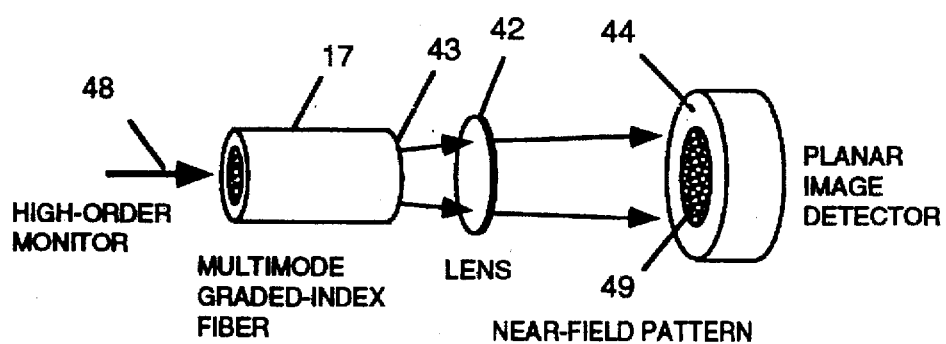

Near-field diagnostic technique for assessing the modes propagating down a multimode graded index fiber are shown in FIGS. 13A and 13B. The end 43 of the multimode graded index fiber 17 is imaged by a high power lens 42, such as a 50:1 microscope objective with a numerical aperture of 0.8, onto a planar image detector 44, such as an infrared lead sulfide vidicon. In FIG. 13A The fundamental mode 45 traversing the fiber 17 has a near-field image 46. Similarly, in FIG. 13B the near field image 49 of a high order mode 48 is depicted.

The results show that the fundamental mode in multimode graded-index fiber is constrained to the central portion of the transmission fiber 17 and does not interact with the core-cladding surface. On the other hand, the high order mode, or modes, fills the entire core. It is important to note that the end 43 of fiber 17 must be examined, not a fiber after a waveguide coupler, since a coupler would mix the modes.

The near-field diagnostic method for examining the modes propagating in the graded-index fiber offers a unique way to assess the alignment of the launcher to the multimode graded-index fiber.

The near-field diagnostic method has also shown that connectors may be added to the multimode graded-index transmission fiber without affecting the modes launched into the fiber. The near field patterns at the end of the said fiber before the connector and at the end of a segment of fiber after the connector have been found to be unchanged. The fundamental mode remain a fundamental mode after the connector, and the high order mode remain the high order mode after the connector. Many commercial connectors with precision ferrules which align the fibers with lateral tolerances of one micrometers will satisfy the alignment requirements. Connectors allows segments of transmission fiber cables to be connected together to form long transmission lines. We have found that precision mechanical splices are also permissible for connecting segments of transmission fibers without mixing modes.

Since near-field diagnostics shows that connectors are allowable in the transmission fiber, the launcher may be manufactured in modular form. All fibers attached to the launcher may be connected to other fibers by means of connectors or splices. Modularity simplifies manufacture and field deployment of intrusional-armed fiber optic communication systems and sensor systems.

WAVEGUIDE FABRICATION

Figure 14:
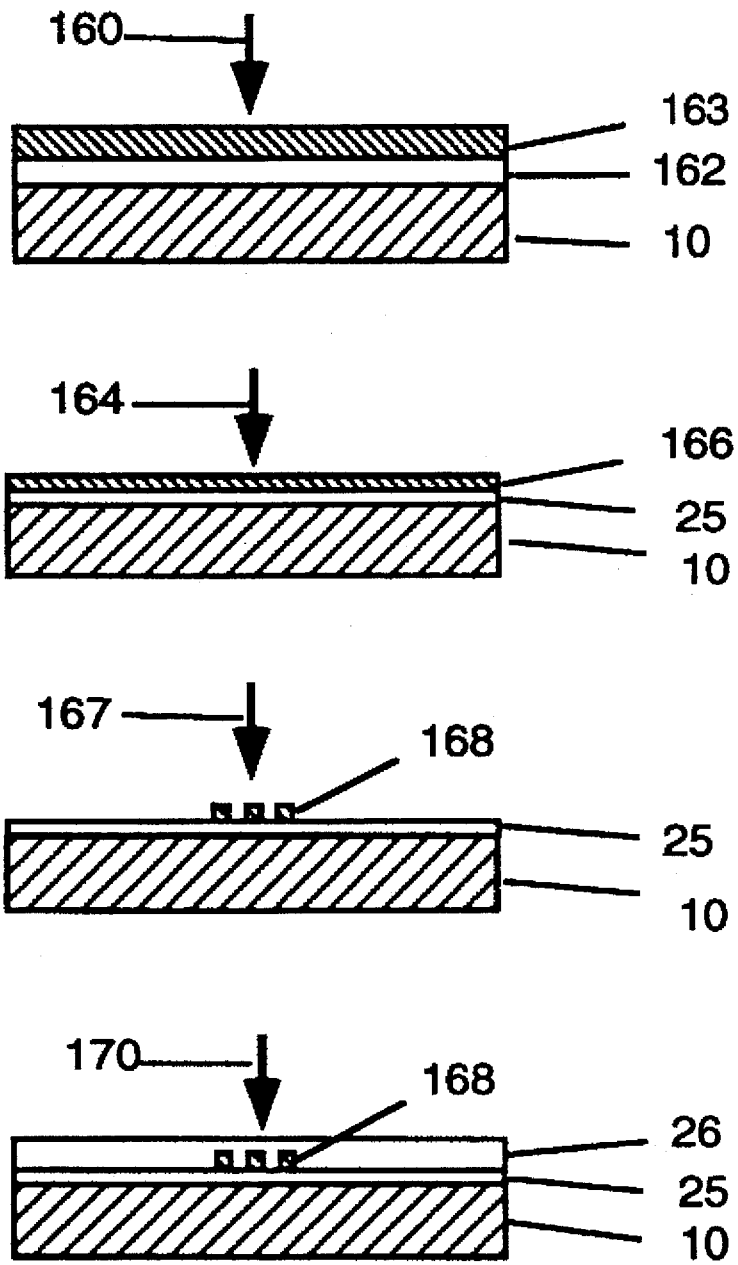
FIG. 14 is a schematic description of the thermo-chemical process used for fabricating waveguides.

There are several processes for fabricating planar waveguides. A commercial process for waveguide fabrication used by a commercial waveguide foundry is illustrated in FIG. 14. The process is used by Photonic Integration Research, Inc., or PIRI, of Columbus, Ohio, who makes customer-designed optical circuits to specifications on order.

Silica glass planar waveguides are formed on a silicon substrate by flame hydrolysis deposition, or FHD, 160. Porous-glass, or soot, is produced by FHD on a silicon substrate 10. A layer of porous silica glass 162 is produced by FHD; then a layer of germanium enriched silica porous glass 163 is formed over the porous silica glass using halide material such as $SiCl_4$, $GeCl_4$, etc. After deposition, the wafer is heated to a high temperature 164 for consolidation of the soot layers into vitreous silica glass 25 and vitreous germanium-enriched silica glass 166. Layer 166 is the waveguide layer. The refractive index of layer 166 is controlled precisely by changing the flow rate of the halides.

Channel waveguides 168 are formed by a combination 167 of photolithographic patterns and reactive ion etching, or RIE. Amorphous silicon is used as the mask material for etching the germanium-enriched silica glass 166. Channels 168 with vertical and smooth side walls are obtained by selection of suitable RIE conditions.

During process 170 the channel waveguides 168 are then covered with porous silica soot which is then consolidated into vitreous silica 26, to form the side and upper silica cladding. The singlemode channel waveguides formed by this process, having cross-sections of 8 micrometers by 8 micrometers and 0.25% refractive index difference with the cladding, are compatible for connection to silica singlemode fibers.

Fiber pigtails are attached to the planar waveguides. Fibers are held in precision rectangular grooves of a miniature plate of silica. Precision rectangular grooves with precise separation between grooves are formed with photolithography and the RIE process. The end of the fiber holder and the fibers held in the holder, and the ends of the planar waveguides are ground and polished to a wedge angle of 82 degrees. The 8 degrees from normal surface prevents Fresnel reflection from guiding itself back to the laser diode and generating noise. A fiber holder is aligned to the waveguide with precision servo-controlled stages to maximize the optical outputs of two waveguide channels. Ultra-violet cured epoxy is then applied and hardened with ultra-violet light. The other fiber holder containing fibers is then aligned for maximum throughput and then epoxied and hardened.

Since the waveguide channel separations and the fiber holders channel separations are to tolerances of much less than a micrometer, all channel to fiber alignments are less than a micrometer. The precision of the fabrication makes unnecessary tedious alignment: once two channels are aligned, the entire waveguide to fiber complex is aligned. The wedge angle and the epoxy minimizes residual back-reflections due to the interface mismatch.

Our invention was constructed and tested. Four waveguide launchers were fabricated to our design and specifications of FIGS. 1 and 1A. We have performed rigorous tests on these units. Near field tests of all units showed that the launchers were able to launch the fundamental mode and high order modes into multimode graded index fiber simultaneously with great precision and minimal excess loss. The units were able to withstand wide temperature variations and severe mechanical shock tests without performance degradation. The feedback and OTDR channels all performed successfully, as designed.

Expanded versatility of a newer waveguide launcher design of FIG. 9 has been described, but the expanded versatility of our invention is not limited to the illustrative examples of FIGS. 1, 2, and 9. For example, the waveguide launcher may launch light waves from a plurality of sources multimodally into many multimode graded-index fibers simultaneously by rerouting, splitting, and merging of channels in an appropriate manner.

It will be appreciated from the foregoing that a planar waveguide launcher makes practical the application of the multimodal technique for launching light into multimode graded index fiber for an intrusion detection communication system and for fiber optic sensing.

In contrast to the above described planar waveguide multimodal launchers, a previously patented lensed bimodal launcher, U.S. Pat. No. 5,003,623, Mar. 25, 1991, described above in Prior Art, has proved to be costly to manufacture, is limited in its performance and versatility, has high excess optical losses, and is unable to withstand temperature extremes and severe mechanical shock tests without performance degradation.

The versatile planar waveguide multimodal launchers have been illustrated with respect to launching several different modes into multimode graded-index fiber, but our invention is not limited to said fiber. The waveguide launcher can launch light from several different light sources into a constant-refractive-index core fiber, called a step-index fiber, into multi-core fibers, into other waveguides. The applications are not limited to these examples.

It will also be appreciated that, although specific embodiments of the invention have been described in detail for purposes of illustration, various modifications may be made without departing from the spirit and scope of the invention. Accordingly, the invention is not to be limited except as by the appended claims.

MULTIPLE MODAL OPTICAL FIBER INTRUSION-ALARMED COMMUNICATION AND SENSOR SYSTEMS

We claim:

1. A planar optical waveguide device for launching a plurality of optical beams into a plurality of sets of predetermined propagation modes of a multimode fiber, comprising:

a plurality of optical singlemode waveguide channels on said planar optical waveguide, a plurality of optical sources for providing said plurality of optical beams, each of said optical singlemode waveguide channel propagating one of said optical beam from one of said optical source, each of said plurality of optical singlemode waveguide channels laterally positioned and angularly aligned with respect to each other in a predetermined arrangement for coupling with said multimode fiber, channel-to-fiber coupling means for connecting said plurality of optical singlemode waveguide channels to said multimode fiber so as to launch said optical beams into said sets of predetermined propagation modes of said multimode fiber, whereby each of said optical beam of said plurality of optical beams, propagating in said optical singlemode waveguide channel of said plurality of optical singlemode waveguide channels, is launched into said set of predetermined propagation modes of said multimode fiber.

2. The planar optical waveguide device of claim 1, wherein:

said multimode fiber is a multimode graded-index fiber with a cylindrical core, said channel-to-fiber coupling means couples in contact a preselected first optical singlemode waveguide channel selected from said plurality of optical singlemode waveguide channels to said multimode graded-index fiber, and aligns axis of said preselected first optical singlemode waveguide channel collinearly to axis of said multimode graded-index fiber, whereby said optical beam in said preselected first optical singlemode waveguide channel is launched into a fundamental propagation mode of said multimode graded-index fiber.

3. The planar optical waveguide device of claim 2, wherein:

said channel-to-fiber coupling means couples in contact a preselected second optical singlemode waveguide channel selected from said plurality of optical singlemode waveguide channels to said multimode graded-index fiber, axis of said preselected second optical singlemode waveguide channel angularly aligned to said axis of preselected first optical singlemode waveguide channel and to said axis of multimode graded-index fiber, said preselected second optical singlemode waveguide channel laterally positioned within said cylindrical core of said multimode graded-index fiber, whereby said optical beam in said second optical singlemode waveguide channel is launched into substantially high order modes of said multimode graded-index fiber.

4. The planar optical waveguide device of claim 3, wherein:

said axis of said preselected second optical singlemode waveguide channel aligns at zero angle, and parallel, with respect to said axis of first optical singlemode waveguide channel, said preselected second optical singlemode waveguide channel positioned laterally within said cylindrical core and touching boundary of said cylindrical core of said multimode graded-index fiber, whereby said optical beam propagating in said preselected second optical singlemode waveguide channel is launched into substantially highest order propagation modes of said multimode graded-index fiber.

5. The planar optical waveguide device of claim 3, wherein:

said channel-to-fiber coupling means couples in contact a preselected third optical singlemode waveguide channel selected from said plurality of optical singlemode waveguide channels to said multimode graded-index fiber, axis of said preselected third optical singlemode waveguide channel aligned angularly with said axis of said preselected first optical singlemode waveguide channel and with said axis of said multimode graded-index fiber, said preselected third optical singlemode waveguide channel laterally positioned within said core boundary of said multimode graded-index fiber, whereby said optical beam in said preselected third optical singlemode waveguide channel is launched into substantially high order propagation modes of said multimode graded-index fiber.

6. The planar optical waveguide device of claim 2, further comprising:

a plurality of additional optical singlemode waveguide channels, a plurality of additional optical sources for providing a plurality of additional optical beams, each said additional optical singlemode waveguide channel propagating one additional optical beam from one additional optical source, each of said plurality of additional input optical singlemode waveguide channels forming an input junction with said first optical singlemode waveguide channel, whereby said plurality of additional optical beams are propagated into said first optical singlemode waveguide channel, whereby said optical beam plus said plurality of additional optical beams are propagated into a fundamental propagation mode of said multimode fiber.

7. The planar optical waveguide device of claim 1, wherein:

said multimode fiber is a multimode graded-index fiber with a cylindrical core, said channel-to-fiber coupling means couples in contact a preselected said optical singlemode waveguide channel selected from said plurality of optical singlemode waveguide channels to said multimode graded-index fiber, said preselected optical singlemode waveguide channel laterally positioned within said cylindrical core of said multimode graded-index fiber, whereby said optical beam propagating in said preselected optical singlemode waveguide channel is launched into substantially high order propagation modes of said multimode graded-index fiber.

8. The planar optical waveguide device of claim 1, further comprising;

a plurality of feedback singlemode waveguide channels, each of said feedback singlemode waveguide channel forming a junction with one of said optical singlemode waveguide channels, wherein said junction splits a predetermined fraction of said optical beam propagating in said optical singlemode waveguide channel into said feedback waveguide channel, whereby each of said feedback singlemode waveguide channel propagates fraction of said optical beam propagating in said optical singlemode waveguide channel.

9. The planar optical waveguide device of claim 8, further comprising:

a plurality of detectors for detecting said fraction of said optical beam propagating in each of said feedback singlemode waveguide channel, whereby detected voltage of each of said detector is used for feedback controlling power output level of each corresponding said optical source emitting said optical beam into said optical singlemode waveguide channel, whereby said power output levels of said plurality of optical sources, and said optical beam power levels propagating In corresponding said optical waveguide channels, are feedback controlled in power.

10. The planar optical waveguide device of claim 1, further comprising:

a plurality of auxiliary optical singlemode waveguide channels, a plurality of auxiliary optical sources for providing a plurality of auxiliary optical beams, each of said auxiliary optical singlemode waveguide channel propagating one of said auxiliary optical beam from one of said auxiliary optical source, each of said plurality of auxiliary optical singlemode waveguide channels forming an input junction with one of said plurality of optical singlemode waveguide channels in a predetermined manner, each said auxiliary optical beam propagating in said auxiliary optical singlemode waveguide channel propagated into said optical singlemode waveguide channel, whereby both optical beams, said optical beam and said auxiliary optical beam, propagating in said optical singlemode waveguide channel are launched into predetermined propagation modes of said multimode fiber.

11. A method for launching a plurality of optical beams into e plurality of sets of redetermined propagation modes of a multimode fiber, comprising:

providing said plurality of optical beams from a plurality of optical sources, providing a plurality of optical singlemode waveguide channels on a planar waveguide, providing each said optical singlemode waveguide channel propagating one said optical beam from one said optical source, providing said multimode fiber, angularly aligning and laterally positioning each of said plurality of optical singlemode waveguide channel with respect to each other for coupling to said multimode fiber, aligning and coupling in contact said plurality of optical singlemode waveguide channels to said multimode fiber, whereby each said optical beam of said plurality of optical beams is launched into said set of predetermined propagation modes of said multimode fiber.

12. The method of claim 11, wherein:

providing a preselected first optical singlemode waveguide channel selected from said plurality of optical singlemode waveguide channels, providing a multimode graded-index fiber with a cylindrical core, coupling in contact said preselected first optical singlemode waveguide channel to said multimode graded-index fiber, collinearly aligning axis of said preselected first optical singlemode waveguide channel to axis of said multimode graded-index fiber, whereby said optical beam propagating is said preselected first optical singlemode waveguide channel is launched into a fundamental propagation mode of said multimode graded-index fiber.

13. The method of claim 12, wherein:

providing a preselected second optical singlemode waveguide channel selected from said plurality of optical singlemode waveguide channels, aligning axis of said preselected second optical singlemode waveguide channel at an angle with said axis of said preselected first optical singlemode waveguide channel, laterally positioning said preselected second optical singlemode waveguide channel within said core boundary at coupling in contact interface, whereby said optical beam propagating in said preselected second optical singlemode waveguide channel is launched into substantially high order propagation modes of said multimode graded-index fiber.

\* \* \* \* \*